United States Patent [19]

Pintar

[11] Patent Number: 4,866,762
[45] Date of Patent: Sep. 12, 1989

[54] APPARATUS FOR RESTRICTING TELEPHONE CALLS

[76] Inventor: Robert R. Pintar, 5340 Willow Creek Rd., Eagle, Id. 83616

[21] Appl. No.: 177,328

[22] Filed: Apr. 4, 1988

[51] Int. Cl.$^4$ .............................................. H04M 1/66
[52] U.S. Cl. ..................................... 379/200; 379/188
[58] Field of Search ...................... 379/188, 199, 200

[56] References Cited

U.S. PATENT DOCUMENTS

| | | | |
|---|---|---|---|
| 4,012,602 | 3/1977 | Jackson | 379/200 |
| 4,188,508 | 2/1980 | Rogers et al. | 379/200 X |
| 4,232,200 | 11/1980 | Hestad et al. | 379/200 X |
| 4,332,982 | 6/1982 | Thomas | 379/200 |
| 4,511,765 | 4/1985 | Kuo | 379/200 X |

OTHER PUBLICATIONS

Linear Applications, vol. 1, National, Radio Shack, 1967.

*Primary Examiner*—James L. Dwyer
*Attorney, Agent, or Firm*—Frank J. Dykas; Craig M. Korfanta

[57] ABSTRACT

An apparatus for restricting outgoing telephone calls 10 includes field effect transistors 501, 502, 503, 504 and 505 connected to telephone lines 11 and 12 in a nonpolar configuration. Signal conditioners dual tone multifrequency integrated circuit decoder 301 and operational amplifier 302 are connected to the MPTs. The outputs of dual tone multifrequency integrated circuit decoder 301 and off amp 302 are directed to microprocessor and piggyback ROM combination 101. Microprocessor and piggyback ROM 101 analyze, store and compare subsequent dialed telephone numbers to restrict particular outgoing calls. Microprocessor and piggyback ROM combination 101 is configured to allow or disallow a particular telephone number based upon an area code, and/or the local office exchange code and/or the particular four-digit customer number.

A method for programming call restricting apparatus 10 is provided and uses a permanently disconnected toll-free line which is always allowed to obtain a clear line which is free from further service attempts by the central office exchange. Microcontroller and piggyback ROM combination 101 if further configured to accept program control codes and restricted or allowed numbers from the user by accepting digits dialed from a connected telephone pad by the user.

13 Claims, 2 Drawing Sheets

APPARATUS FOR RESTRICTING TELEPHONE CALLS

BACKGROUND OF THE INVENTION

1. Technical Field

This invention generally relates to devices for restricting unauthorized users from placing certain telephone calls. In particular, this invention relates to a programmable telephone call restricting apparatus which can be placed directly in the telephone lines or housed within a telephone set.

2. Background Art

Unauthorized use of the telephone for placing toll calls has been a problem for quite some time. The recent increase in the number of businesses providing information services via toll lines, such as 900 numbers, has amplified the problem greatly. This has resulted in many telephone customers receiving large telephone bills due to unauthorized toll charges. Additionally, parents have to worry about the type of material their children have access to via an unrestricted telephone.

In the current state of the art several different methods are employed by call restriction apparatus. One such method, as disclosed in ROGERS, ET AL., Pat. No. 4,188,508, provides for restricting a telephone call based upon interpreting the first seven dialed digits and comparing them with a list of allowed numbers stored in a memory device. For toll calls, the acceptance or rejection of the call is based on allowed area codes and/or exchange prefixes. Consequently, the device is incapable of allowing or prohibiting individual telephone numbers.

A second device, as disclosed in HESTAD, ET AL., Pat. No. 4,232,200, teaches a microprocessor based repertory dialing system which has limited call restriction capabilities. In the call restriction mode, the device simply restricts all out-going toll calls unless a secret code is entered prior to dialing the telephone number. The secret code is installed into the apparatus by four electrical switches arranged in a binary configuration. The drawbacks to this device are that it does not provide for selective call restriction and that it is difficult to program the secret bypass code into the apparatus.

Another method for restricting telephone calls as taught in JACKSON, Pat. No. 4,012,602, is based on simply counting the number of digits contained in the dialed telephone number and restricting any calls containing more than a predetermined number of digits. Here again, the device is too restrictive and does not allow for the placement of authorized toll calls.

What is needed is a device which is easy to operate, relatively inexpensive, and allows for selective call restriction, thereby providing for a flexible call restricting device and further can be installed in a tamper free location.

Accordingly, it is an object of this invention to provide a call restricting apparatus which can be installed in the telephone lines and is capable of selectively restricting telephone calls. Another object of this invention is to provide a call restricting apparatus which is easy to program and does not require manipulation of hardware. Still another object of this invention is to provide a call restricting apparatus which is essentially self-contained and can be installed in an inconspicuous location such as within the telephone set, in a wall jack, or in the incoming telephone lines.

DISCLOSURE OF INVENTION

The present call restricting apparatus is a microprocessor based system which processes the touch tone or dial pull line interruption. The microprocessor searches a list, which is stored in RAM (random access memory), interprets the command, and then either allows, prohibits or time limits the call.

The call restricting apparatus is connected to the two incoming telephone lines by a pair of field effect transistors which are controlled by a second pair of field effect transistors, and are configured to provide a nonpolar connection to the telephone line. This allows the installer of the present call restricting apparatus, freedom from polarity considerations. The first pair of field effect transistors also provide a means for disconnecting the call restricting apparatus and consequently the telephone set from the telephone lines in the event of a disallowed telephone number. The call restricting apparatus is powered from the line by a bridge rectifier through isolating diodes, which prevent leakage currents while the apparatus is disconnected, which is known as the "on-hook" condition. In the case of a touch tone telephone, the tones are decoded by a dual tone multifrequency integrated circuit decoder which converts the tones into a binary number for input into the microprocessor. In the case of a rotary or dial pull type telephone set, the line interruptions are conditioned by a pulse signal conditioner and fed serially into the microprocessor. The microprocessor analyzes the incoming conditioned signals to determine if the call is to be unconditionally allowed or allowed up to a programmable preselected number of five minute increments to a maximum of one hour. This may be accumulated over one call or more. Each call consumes a minimum of one five minute increment. In the case of a disallowed call, the call restricting apparatus simply disconnects itself from the telephone line. In the case of an allowed call, the microprocessor goes into an idle mode that allows the call to go through.

Once a telephone call has either been completed or disallowed, the reset control resets the microprocessor so it is now able to interpret a new set of tones or dial pulls. During a line interruption, the microprocessor is powered by a storage capacitor which is connected in parallel with the microprocessor from the power supply line to the ground.

The present invention allows for several modes of operation, its capabilities include the prohibiting of all calls, prohibiting all calls except those calls allowed by the list, allow all calls, allow all calls except those prohibited by the list, allow this call only, local calls only, or local calls plus those allowed by the list. It should be noted that the 911 emergency number is always allowed.

A particular "1-800" number is also always allowed. This number corresponds to a permanently disconnected toll free line which is used to program any number of call restricting devices. To program the call restricting apparatus, one simply has to dial the toll free programing number and obtain a ringing signal or a busy signal. This provides a clear line, wherein the central telephone office will not attempt any further service on this line. Once a clear line is obtained the programmer simply enters a unique security code sequence into the telephone to gain access to the random access memory for storing prohibited or allowed telephone numbers and to select the proper mode of operation. The random access memory is capable of storing up to 23 eleven-digit entries. The first ten digits of each entry include the area code, exchange, and the number. The eleventh digit determines if the entry is to be allowed, prohibited or timed. This provides added flexibility by partially overriding the mode of operation. For instance, if the call restricting apparatus were operating in the allow all calls except those prohibited by the list mode, and the list contained a 900 number with don't care digits occupying the last seven positions of the telephone number and a second particular 900 number with an allow digit in the eleventh place, the telephone call restricting apparatus would prohibit all 900 numbers except the particular 900 number allowed by the eleventh digit. The mode selection feature, the eleventh digit prohibit, allow or time feature, and the don't care digit feature, allow for a virtually limitless combination of call restricting capabilities.

The advantages over the current state of the art of the present invention will be more apparent upon examination of the following detailed disclosure.

BEST MODE FOR CARRYING OUT INVENTION

Figure 1:
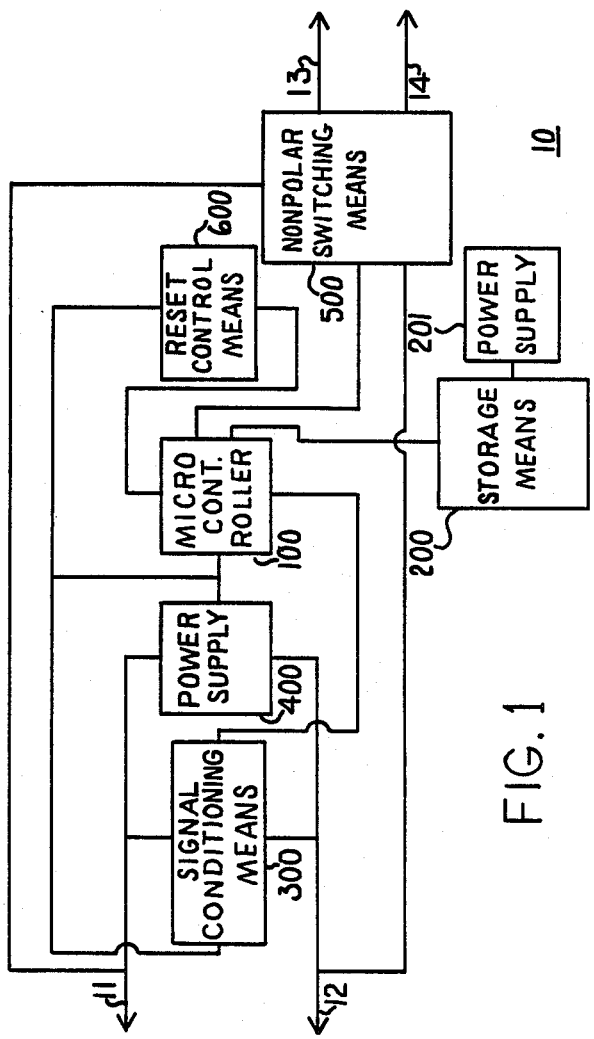
FIG. 1 is a simplified circuit schematic of the call restricting apparatus.

The call restricting apparatus 10 is shown connected between the incoming telephone lines 11 and 12 and outgoing telephone lines 13 and 14 in a simplified block circuit schematic as shown in FIG. 1. Telephone lines 11 and 12 are connected at their other end to the central telephone office exchange, while outgoing telephone lines 13 and 14 are connected to a typical telephone set not shown. The present call restricting apparatus accepts a dialed telephone number through a nonpolar switching means 500, which is connected to telephone lines 13 and 14. A means for processing the dialed telephone number is provided by the microcontroller 100, storage means 200, signal conditioning means 300, and reset control means 600, all of which are powered by a means for converting a variable polarity current to a stable polarity current 400, also referred to as the power supply 400. The nonpolar switching means 500 is also connected to both of the incoming telephone lines 11 and 12. The dialed number is then introduced via an electrical connection into the signal conditioning means 300, which is also connected to telephone lines 11 and 12. The conditioned signal is sent to the microcontroller 100. The signal is then processed by the microcontroller 100, which searches the storage means 200 and determines if the dialed number is to be prohibited or allowed. If the number is to be prohibited, the microcontroller 100 generates a disconnect signal and sends it to the nonpolar switching means 500.

Figure 2:
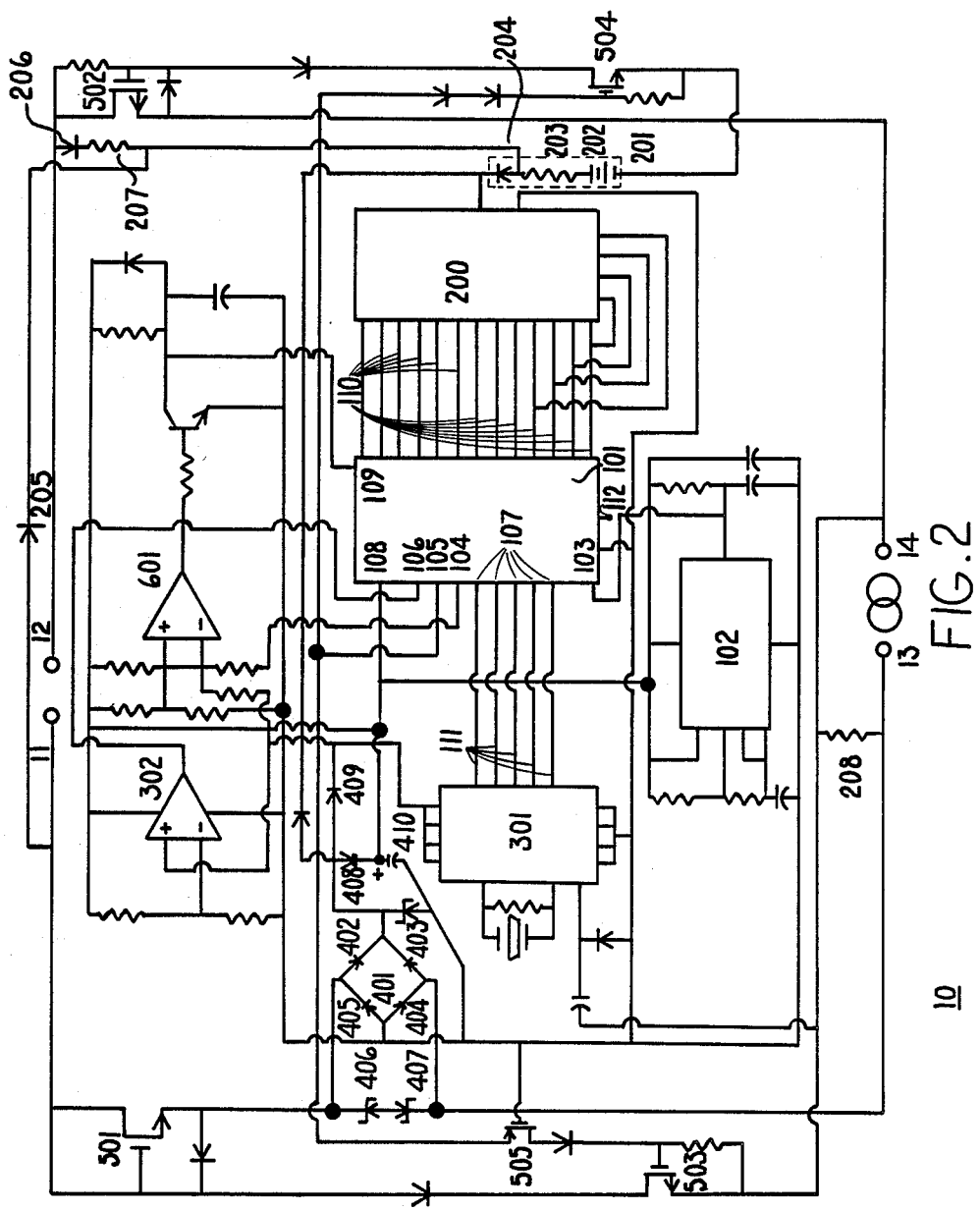
FIG. 2 is a detailed circuit schematic of the call restricting apparatus.

The power supply 400 is connected to telephone lines 11 and 12. During the disconnect period, the storage device 200, a random access memory device, is powered by a separate power supply 201 while the microcontroller is powered by a storage capacitor 410 as shown in FIG. 2. In the case of an allowed telephone number, the microcontroller 100 goes into an idle state allowing the call to go through. A more detailed description of the present call restricting apparatus 10 follows and references FIG. 2 of the drawings.

Referring now to FIGS. 1 and 2, nonpolar switching means 500, consisting of field effect transistors 501, 502, 503, 504 and 505, are connected to the telephone lines 11 or 12 servicing the central office exchange and to the telephone lines 13 and 14 servicing the telephone. The connection of the field effect transistors 501, 502, 503, 504 and 505 as shown, provide for a nonpolar connection to the telephone lines. Connected to telephone line 13 and telephone line 11 through field effect transistor 501 is power supply 400. In this particular embodiment, it consists of a rectifying bridge 401 having diodes 402, 403, 404, and 405. Zener diodes 406 and 407 are used in a back to back configuration to provide a non polarized power source. The positive side of the bridge rectifier 401 is connected to the positive supply pin 108 of the microcontroller 101. Microcontroller 101, in its preferred embodiment, is a National Semiconductor COP 444 CP four-bit microprocessor and National Semiconductor NMC 27C16 piggyback ROM (read only memory) combination. Connected to the microprocessor and piggyback ROM combination 101 is a Harris HM-6561 random access memory storage device 200 through data and control bus 110. The RAM 200 is provided with a power supply 201. During an on-hook condition, the random access memory storage device 200 is powered by power supply 201 by bleeding off a small current from phone lines 11, 12, 13 and 14, by providing a pair of large resistors 207 and 208, typically 5 megohms, connected across each pair of phone lines 11 and 12, and 13 and 14. Diodes 205 and 206 are provided to pass only a single polarity current. Power supply 201 also has a backup battery 202 for supplying a current through a current limiting resistor 203 and buffered by an isolating diode 204, in case the call restricting apparatus 10 is totally disconnected from telephone lines 11 and 12. The isolating diode 204 prevents current flow into the power supply 201 during an "off-hook" condition. The microprocessor and piggyback ROM combination 101 are provided with a system clock which is a 555 timer 102 in a standard astable configuration. The output of the 555 timer 102 is connected to the microprocessor and piggyback ROM combination 101 at clock input pin 103.

When a service request from the telephone set connected at telephone lines 13 and 14 enters the call restricting apparatus 10 through field effect transistors 503, 504 and 505, it is routed to the signal conditioning means 300. In the case of a touch tone signal, the tone is routed directly to the Silicon Systems SSI 204 dual tone multifrequency integrated circuit decoder 301, or commonly called a DTMF, which is powered by the bridge rectifier 401 through an isolating diode 409. The DTMF 301 converts the dual frequency tone to a binary equivalent and sends the binary equivalent to microprocessor and piggyback ROM combination 101 through a second control and data bus 111 connected at input pins 107 on the microprocessor and piggyback ROM combination 101. In the case of a pulse signal, or commonly referred to as a dial pull, the pulse is routed to a pulse signal conditioner which consists of an operational amplifier 302 configured in a well known manner. The pulse conditioning operational amplifier 302 is powered by bridge rectifier 401 through diode 408. The output of the operational amplifier 302 is routed to a bidirectional input port at pin 106 on the microprocessor and piggyback ROM combination 101. A series of conditioned pulses corresponding to a single digit are routed serially in this manner.

The microprocessor and piggyback ROM combination 101 monitor the input signals from the DTMF 301 and pulse conditioning operational amplifier 302 and compare the input signals to reference signals located in RAM 200. When a valid signal is obtained, the ROM instructs the microprocessor as to the proper course of action. In the case of a telephone number, the microprocessor searches the RAM 200 for numbers which have been programmed into the RAM 200. Based on what the microprocessor finds, the ROM instructs the microprocessor to either allow, prohibit or time the telephone call. If the number is disallowed or prohibited, the ROM instructs the microprocessor to generate a disconnect signal via connection pin 105. Connected to pin 105 are control field effect transistors 503, 504 and 505, which in turn disconnect the call restricting apparatus 10 from telephone lines 11 and 12 through field effect transistors 501 and 502. If the number is allowed, microprocessor and piggyback ROM combination 101 shifts into an idle mode and allow the call to be completed.

In the case where the microprocessor and piggyback ROM combination 101 detect a valid programming control signal, the ROM instructs the microprocessor to accept further programming signals which allow the user to program into RAM 200 up to 23 eleven digit telephone numbers. The eleven digit telephone numbers have the first three digits corresponding to the area code, the second three digits corresponding to the office exchange number, the next four digits corresponding to the individual telephone number, and the eleventh digit corresponds to a prohibit, allow or time digit. The ROM then instructs the microprocessor to accept a control signal corresponding to the desired mode of operation. The microprocessor and piggyback ROM combination 101 acknowledges a valid programming control signal by generating a high frequency series of signals to nonpoler switching means 500 which can be heard by the user on the telephone set.

A reset control means 600 is provided for resetting the program flow of the microprocessor and piggyback ROM combination 101 and is connected through a transistor to the reset pin 109 of the microprocessor and piggyback ROM combination 101. The reset control means 600 consists of an operational amplifier 601 in a standard comparator configuration. A voltage is supplied to the inverting terminal input of the operational amplifier 601 by the microprocessor and piggyback ROM combination 101 via a connection to pin 104 on the microprocessor and piggyback ROM combination 101. This voltage signal provides a reference voltage for the operational amplifier 601 comparator configuration to prevent a reset signal from being generated during line interruptions caused by dial pulls. A dial pull or line interruption causes a voltage drop and a subsequent change in the output state of the operational amplifier 601. Because the microprocessor and piggyback ROM combination 101 are supplied by a storage capacitor 410 during a line interruption, the reset inhibit signal generated by the microprocessor and piggyback ROM combination 101 via pin 104, remains stable allowing the microcontroller 100 to interpret the dial pull pulses.

A means for programming the call restricting apparatus 10 is provided and requires the user to dial a predetermined toll free number which is always allowed. This toll free number correspons to a disconnected line which enables the user to generate touch tone or dial pull signals without service attempts by the central telephone office which may otherwise interpret programming instructions as valid telephone exchange signals, and attempt a line connection. The user then enters a four digit authorization code. In the preferred embodiment the valid programming code is followed by a beep generated by the microcontroller 100 which acknowledges a valid sequence. If an invalid sequence is entered, the call restricting apparatus 10 disconnects itself and consequently the telephone from the line for several seconds and then reconnects, restoring the dial tone. Upon a valid sequence followed by a beep, numbers are entered into the list in the RAM 200 by dialing a two digit list address, 01-23, followed by a ten digit number, followed by a two for allow, a three for prohibit or a one, followed by a two digit number, which corresponds to the number of minutes over which this call(s) is to be limited. A successful list entry is followed by a beep after which a new list address may be selected, a new number entered, until the list is complete. The programming is terminated by a command selection. This is done by dialing a 00, followed by the command one through eight. Command one corresponds to the prohibit all calls mode, command two corresponds to allow all calls except those prohibited by the list mode, command three corresponds to the allow calls mode, command four corresponds to the prohibit all calls except those allowed by the list mode, command five corresponds to allow this call only, command six clears the list, command seven corresponds to the local calls only, and command eight corresponds to the local calls only plus those allowed by the list mode.

To enter in telephone numbers containing don't care digits the user first selects the list address. For a number containing an arbitrary area code, the telephone number is entered as follows: 0, the three digit exchange, the four digit telephone number, either a two, a three or a one followed by total accumulated time allowed. For a telephone number containing an arbitrary area code and a four digit telephone number, the entry is entered as follows: 00, the three digit exchange number, and the allow, prohibit or time code. To enter a number in the list which contains an arbitrary four digit telephone number, the user keys in the numbers as followed: 000, the three digit area code, a three digit exchange and the allow, prohibit or time code. To enter a number which has both an arbitrary exchange number and an arbitrary four digit telephone number, the user keys in the following: the three digit exchange number followed by a zero, and the allow, prohibit or time code.

A second means for programming the call restricting apparatus 10 is provided through a bidirectional serial data port at pin 112 of microcontroller and piggyback ROM combination 101. Using an external serial device and a means for displaying digital information (not shown) the contents of the RAM 200 can be changed and/or displayed. It should be further obvious to one skilled in the art that bidirectional data port 112 could be further used to monitor telephone activity using an external serial device and displaying means such as a personal computer.

While there is shown and described the present preferred embodiment of the invention, it is to be distinctly understood that this invention is not limited thereto but may be variously embodied to practice within the scope of the following claims.

I claim:

1. A telephone call restricting apparatus for installation at an interface between a telephone and a telephone line, which comprises:
   nonpolar switching means for connecting and disconnecting a telephone and a telephone line, electrically connected to the telephone and the telephone line;
   signal conditioning means for converting a dialed number signal from the telephone to a digital signal for either a dialed telephone number or a control signal, connected to the nonpolar switching means;
   a microcontroller for receiving digital signals for dialed telephone numbers and control signals, and for generating an allow or disallow signal, electrically connected to the signal conditioning means and the switching means;
   said microcontroller including a read only memory device being configured to instruct the microcontroller to accept and analyze up to eleven digit telephone numbers, accept and store unique security codes, accept and store operation mode codes, accept and store a plurality of allowed and/or prohibited telephone numbers, accept and store an allow or prohibit code and accept and store a timing code, wherein all of said codes and numbers can be generated from the connected telephone;
   storage means for storing control signals electrically connected to the microcontroller;
   power supply means, for receiving telephone line power through the switch means electrically connected to the switching means, signal conditioning means, microcontroller and storage means.

2. The telephone call restricting apparatus of claim No. 1 wherein the nonpolar switching means comprises:
   a plurality of field effect transistors connected between the telephone and the telephone line to connect or disconnect the telephone and telephone lines;
   said field effect transistors are connected and responsive to the microcontroller.

3. The telephone call restricting apparatus of claim No. 1 further comprising
   reset control means connected to the microcontroller for generating a reset signal to the microcontroller.

4. The telephone call restricting apparatus of claim No. 3 wherein the reset control means further comprises an operational amplifier connected to the microcontroller for generating a reset signal for the microcontroller during the on-hook condition.

5. The telephone call restricting apparatus of claim No. 3 wherein the storage means further comprises a random access memory device connected to the microcontroller for storing the processed dial pulls or tones.

6. The telephone call restricting apparatus of claim No. 5 further comprising a second power supply for supplying power to said random access memory device during a line interruption.

7. The telephone call restricting apparatus of claim No. 1 wherein the signal conditioning means further comprises:
   a dual tone multifrequency integrated circuit decoder, connected to the nonpolar switching means and responsive to tones generated by standard touch tone telephones, where the dual tone multifrequency decoder converts the tone signal to a digital signal;
   an operational amplifier connected to the nonpolar switching means, for conditioning the line interruptions to provide a digital signal.

8. The telephone call restricting apparatus of claim No. 1 further comprising a bidirectional serial data port in said microcontroller, electrically connected and responsive to an external digital device for generating and receiving digital signals to and from said processing means.

9. A method for programming the telephone call restricting apparatus of claim No. 1 which comprises the steps of:
   dialing a particular toll-free telephone number to provide a clear line for transmitting telephone numbers and control signals;
   dialing programming control signals; and
   entering allowed and disallowed telephone numbers.

10. A telephone call restricting apparatus comprising:
    a plurality of field effect transistors operably connected between the telephone and the telephone line to connect and disconnect the telephone to and from the telephone line;
    a bridge rectifier connected to the telephone line and said field effect transistors, for converting a variable polarity current to a single polarity current;
    a pulse signal conditioning means operably connected to said bridge rectifier, for converting a telephone line interruption to a digital signal;
    a dual tone multifrequency integrated circuit decoder operably connected to the telephone line, said pulse signal conditioner, and said bridge rectifier, for converting a dual frequency tone to a plurality of digital signals;
    a microcontroller operably connected to said field effect transistors, said bridge rectifier, said pulse signal conditioner, and said dual tone multifrequency integrated circuit decoder, for processing said digital signals and generating an allow or disallow signal to said field effect transistors;
    said microcontroller including a read only memory device being configured to instruct the microcontroller to accept and analyze up to eleven digit telephone numbers, accept and store unique security codes, accept and store operation mode codes, accept and store a plurality of allowed and/or prohibited telephone numbers, accept and store an allow or prohibit code and accept and store a timing code, wherein all of said codes and numbers can be generated from the connected telephone;
    a random access memory device operably connected to said bridge rectifier and said microcontroller, for storing digital signals generated by said microcontroller;
    a second power supply operably connected to said random access memory device, for supplying power to said random access memory during a line interruption;
    a reset control means operably connected to said bridge rectifier, said pulse signal conditioner, and said microcontroller, for generating a reset signal to said microcontroller.

11. The telephone call restricting apparatus of claim No. 10 further comprising a bidirectional serial data port in said microcontroller, responsive to an external digital device for generating and receiving numbers to and from said processing means.

12. A method for programming the telephone call restricting apparatus of claim No. 11 which comprises the steps of:
- dialing a particular toll-free telephone number to provide a clear line for transmitting telephone numbers and control signals;
- dialing programming control signals; and
- entering allowed and disallowed telephone numbers.

13. A method for programming the telephone call restricting apparatus of claim No. 10 which comprises the steps of:
- dialing a particular toll-free telephone number to provide a clear line for transmitting telephone numbers and control signals;
- dialing programming control signals; and
- entering allowed and disallowed telephone numbers.

* * * * *